United States Patent
Peterson et al.

(10) Patent No.: US 9,537,746 B2
(45) Date of Patent: Jan. 3, 2017

(54) MANAGING A DATA RATE BASED ON AN AMOUNT OF AVAILABLE DATA FOR A PREDETERMINED TIME PERIOD

(75) Inventors: Nathan J. Peterson, Durham, NC (US); Scott Edwards Kelso, Cary, NC (US); John Carl Mese, Cary, NC (US); Russell Speight VanBlon, Raleigh, NC (US); Rod D. Waltermann, Rougemont, NC (US); Arnold S. Weksler, Raleigh, NC (US)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 552 days.

(21) Appl. No.: 13/614,928

(22) Filed: Sep. 13, 2012

(65) Prior Publication Data

US 2014/0075012 A1   Mar. 13, 2014

(51) Int. Cl.
| | |
|---|---|
| *G06F 15/173* | (2006.01) |
| *H04L 12/26* | (2006.01) |
| *H04L 12/24* | (2006.01) |
| *H04L 12/14* | (2006.01) |
| *H04L 12/815* | (2013.01) |

(52) U.S. Cl.
CPC .......... *H04L 43/16* (2013.01); *H04L 12/1435* (2013.01); *H04L 12/1439* (2013.01); *H04L 41/5006* (2013.01); *H04L 41/5025* (2013.01); *H04L 43/0894* (2013.01); *H04L 47/22* (2013.01)

(58) Field of Classification Search
CPC ............... H04M 15/58; H04M 15/854; H04M 2215/0188; H04M 15/61; H04M 15/723; H04M 15/745; H04W 72/1257; H04L 43/0876; H04L 12/1417; H04L 67/22; H04L 67/306
USPC ........ 709/223, 224, 226, 231; 455/405, 406, 455/452.1
See application file for complete search history.

(56) References Cited

U.S. PATENT DOCUMENTS

| | | | | |
|---|---|---|---|---|
| 2002/0046264 | A1* | 4/2002 | Dillon | H04B 7/18584 709/219 |
| 2010/0002723 | A1* | 1/2010 | Kerr et al. | 370/468 |
| 2010/0017506 | A1* | 1/2010 | Fadell | 709/224 |
| 2011/0277001 | A1* | 11/2011 | Kaluskar | H04L 12/2818 725/80 |
| 2012/0108200 | A1* | 5/2012 | Rubin et al. | 455/405 |
| 2012/0302205 | A1* | 11/2012 | Breitbach | 455/406 |
| 2013/0065555 | A1* | 3/2013 | Baker et al. | 455/410 |
| 2013/0346624 | A1* | 12/2013 | Chervets | H04M 15/58 709/231 |

(Continued)

*Primary Examiner* — Dustin Nguyen
*Assistant Examiner* — Hao Nguyen
(74) *Attorney, Agent, or Firm* — Kunzler Law Group

(57) ABSTRACT

An apparatus for managing a data rate based on an amount of available data for a predetermined time period includes a storage device storing machine-readable code and a processor executing the machine-readable code. The machine-readable code includes a determination module determining a target data rate for data communication over a network by a network device. The target data rate is based on an amount of available data for a predetermined time period and an amount of time remaining in the predetermined time period. The machine-readable code includes a data rate module maintaining the data rate at or below the target data rate in response to the determination module determining the target data rate.

15 Claims, 6 Drawing Sheets

(56) References Cited

U.S. PATENT DOCUMENTS

2014/0242943 A1* 8/2014 Mohammed ........ H04L 12/1407
455/406

* cited by examiner

MANAGING A DATA RATE BASED ON AN AMOUNT OF AVAILABLE DATA FOR A PREDETERMINED TIME PERIOD

BACKGROUND

Field

The subject matter disclosed herein relates to managing a data rate and more particularly managing a data rate based on an amount of available data for a predetermined time period.

Description of the Related Art

A consumer typically has one or more subscriptions for internet access from Internet Service Providers (ISPs), cellular telephone service providers, and the like. Often, as is the case with many cellular telephone service providers, the consumer has a limited amount of data in which the consumer is entitled within a predetermined time period.

The consumer may exceed the quota and face overage charges. In attempting to stay below the quota, the consumer often leaves data unused. Furthermore, a data quota may be used in other data environments besides cellular environments. Specifically, certain ISPs may begin implementing data quotas for home internet use.

BRIEF SUMMARY

Based on the foregoing discussion, the inventors have recognized a need for an apparatus, system, and method for managing a data rate based on an amount of available data for a predetermined time period. Beneficially, such an apparatus, system, and method would maintain a data rate at or below a target data rate based on the amount of available data and a time remaining in the predetermined time period.

The embodiments of the present subject matter have been developed in response to the present state of the art, and in particular, in response to the problems and needs in the art that have not yet been fully solved by currently available network devices. Accordingly, the embodiments have been developed to provide a method, apparatus, and system for managing a data rate based on an amount of available data for a predetermined time period.

An apparatus is provided that, in one embodiment, includes a storage device storing machine-readable code and a processor executing the machine-readable code. In one embodiment the machine-readable code includes a determination module determining a target data rate for data communication over a network by a network device. The target data rate may be based on an amount of available data for a predetermined time period and an amount of time remaining in the predetermined time period. The machine-readable code includes a data rate module maintaining the data rate at or below the target data rate in response to the determination module determining the target data rate.

A method is also presented, that in the disclosed embodiments, substantially includes the steps to carry out the functions presented above with respect to the operation of the described apparatus. In one embodiment, the method includes determining a target data rate for data communication over a network by a network device. The target data rate may be based on an amount of available data for a predetermined time period and an amount of time remaining in the predetermined time period. In one embodiment, the method includes maintaining the data rate at or below the target data rate in response to determining the target data rate.

A computer program product including a storage device storing machine readable code executed by a processor to perform operations is also presented. In one embodiment, the operations include determining a target data rate for data communication over a network by a network device. The target data rate may be based on an amount of available data for a predetermined time period and an amount of time remaining in the predetermined time period. In one embodiment, the method includes maintaining the data rate at or below the target data rate in response to determining the target data rate.

References throughout this specification to features, advantages, or similar language do not imply that all of the features and advantages may be realized in any single embodiment. Rather, language referring to the features and advantages is understood to mean that a specific feature, advantage, or characteristic is included in at least one embodiment. Thus, discussion of the features and advantages, and similar language, throughout this specification may, but do not necessarily, refer to the same embodiment.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of the embodiments as set forth hereinafter.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
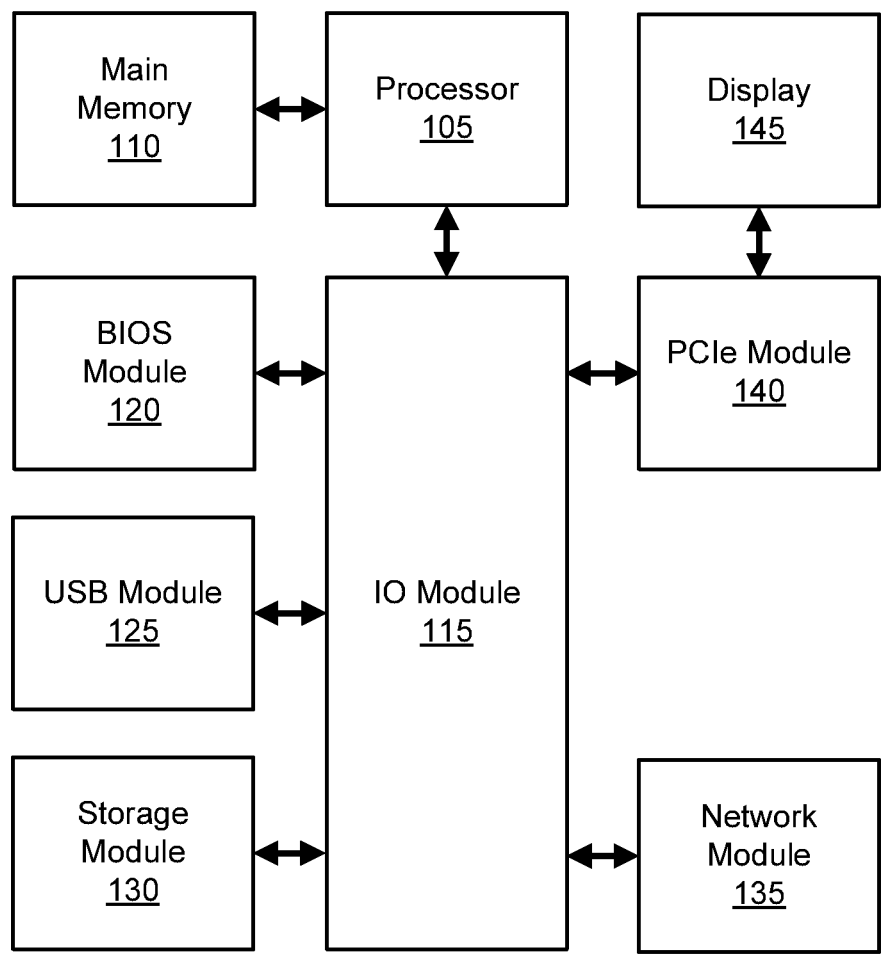
FIG. 1 is a schematic block diagram illustrating one embodiment of an information handling device in accordance with the present subject matter.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more storage devices storing machine readable code. The storage devices may be tangible, non-transitory, and/or non-transmission.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in machine readable code and/or software for execution by various types of processors. An identified module of machine readable code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of machine readable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the software portions are stored on one or more storage devices.

Any combination of one or more machine readable medium may be utilized. The machine readable storage medium may be a machine readable signal medium or a storage device. The machine readable medium may be a storage device storing the machine readable code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this file, a computer readable storage medium may be any tangible medium that can contain, or store a program for use by or in connection with an instruction execution system, apparatus, or device.

A machine readable signal medium may include a propagated data signal with machine readable code embodied therein, for example, in baseband or as part of a carrier wave. Such a propagated signal may take any of a variety of forms, including, but not limited to, electro-magnetic, optical, or any suitable combination thereof. A machine readable signal medium may be any storage device that is not a computer readable storage medium and that can communicate, propagate, or transport a program for use by or in connection with an instruction execution system, apparatus, or device. Machine readable code embodied on a storage device may be transmitted using any appropriate medium, including but not limited to wireless, wireline, optical fiber cable, Radio Frequency (RF), etc., or any suitable combination of the foregoing.

Machine readable code for carrying out operations for embodiments may be written in any combination of one or more programming languages, including an object oriented programming language such as Java, Smalltalk, C++ or the like and conventional procedural programming languages, such as the "C" programming language or similar programming languages. The machine readable code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by machine readable code. These machine readable code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The machine readable code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The machine readable code may also be loaded onto a computer, other programmable data processing apparatus, or other devices to cause a series of operational steps to be performed on the computer, other programmable apparatus or other devices to produce a computer implemented process such that the program code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and machine readable code.

FIG. 1 is a schematic block diagram illustrating one embodiment of an information handling device 100. The information handling device 100 includes a processor 105, a memory 110, an IO module 115, a basic input/output system ("BIOS") module 120, a universal serial bus ("USB") module 125, a storage module 130, a network module 135, a peripheral component interconnect express ("PCIe") module 140, and a display 145. One of skill in the art will recognize that other configurations of an information handling device 100 or multiple information handling devices 100 may be employed with the embodiments described herein.

The processor 105, memory 110, the IO module 115, the BIOS module 120, the USB module 125, the storage module 130, the network module 135, the PCIe module 140, referred to herein as components, may be fabricated of semiconductor gates on one or more semiconductor substrates. Each semiconductor substrate may be packaged in one or more semiconductor devices mounted on circuit cards. Connections between the components may be through semiconductor metal layers, substrate-to-substrate wiring, circuit card traces, and/or wires connecting the semiconductor devices.

The memory 110 stores computer readable programs. The processor 105 executes the computer readable programs as is well known to those skilled in the art. The computer readable programs may be tangibly stored in the storage module 130. The storage module 130 may comprise at least one Solid State Device ("SSD"). In addition, the storage module 130 may include a hard disk drive, an optical storage device, a holographic storage device, a micromechanical storage device, or the like.

The processor 105 may include integrated cache to reduce the average time to access memory 115. The integrated cache may store copies of instructions and data from the most frequently used memory 110 locations. The processor 105 may communicate with the memory 110.

In addition, the processor 105 may communicate with the IO module 115. The IO module 115 may support and communicate with the BIOS module 120, the network module 135, the PCIe module 140, and the storage module 130.

The PCIe module 140 may communicate with the IO module 115 for transferring data or power to peripheral devices. The PCIe module 140 may include a PCIe bus for attaching the peripheral devices. The PCIe bus can logically connect several peripheral devices over the same set of connections. The peripherals may be selected from a printer, a scanner, or the like. The PCIe module 140 may also comprise an expansion card as is well known to those skilled in the art. In one embodiment, the PCIe module 140 is in communication with a display. Specifically, in one embodiment, the PCIe module comprises a PCIe expansion card in communication with the display. In one embodiment, the PCIe expansion card comprises a PCIe Mini Card. The display 145 may be a cathode ray tube ("CRT"), a liquid crystal display ("LCD") monitor, or the like.

The BIOS module 120 may communicate instructions through the IO module 115 to boot the information handling device 100, so that computer readable software instructions stored on the storage module 130 can load, execute, and assume control of the information handling device 100. The BIOS module 120 may comprise a coded program embedded on a chipset that recognizes and controls various devices that make up the information handling device 100. The BIOS module 120 may refer to various approaches to providing a firmware interface for booting an information handling device 100, including traditional BIOS, unified extensible firmware interface (UEFI), Open Firmware, and others. The BIOS module 120, in one embodiment, includes a storage device that stores the relevant instructions for booting. The storage device may be a solid state storage device, such as Flash memory. The BIOS module 120 may be a solid state storage device with relevant code that is attached to a motherboard of the information handling device 100.

The network module 135 may communicate with the IO module 115 to allow the information handling device 100 to communicate with other devices over a network. The devices may include routers, bridges, computers, printers, and the like. The USB module 125 may communicate with one or more USB compatible devices over a USB bus.

Figure 2A:
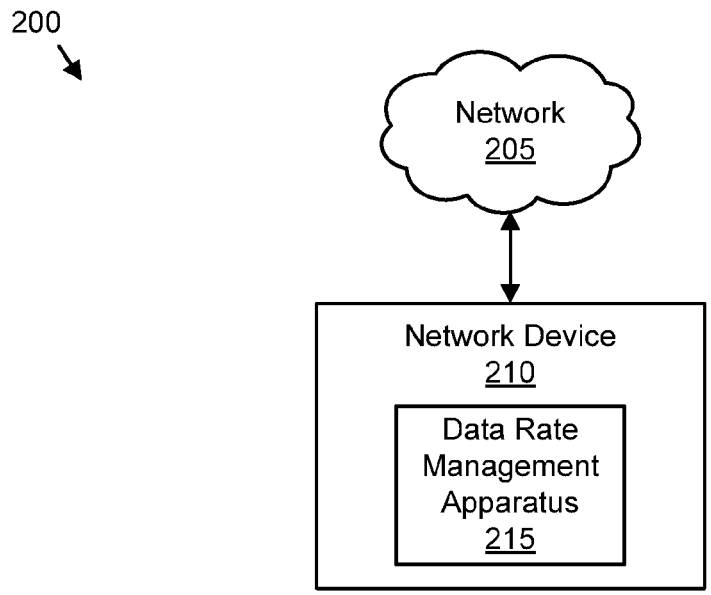
FIG. 2A is a schematic block diagram illustrating one embodiment of a system for managing a data rate based on an amount of available data for a predetermined time period in accordance with the present subject matter.

FIG. 2A depicts one embodiment of a system 200 for managing a data rate based on an amount of available data for a predetermined time period. The system 200 includes a network device 210 in communication with a network 205. The network device 210 may upload and download data with other devices over the network 205 as is known in the art. In one embodiment, the network device 210 is associated with one or more of a particular user, a user account, a household, and a group of devices that are allocated a data quota. The data quota is an amount of data for a predetermined time period. The data quota may represent an amount of data available for upload and download over the network 205 for the predetermined time period. The amount of data may be assigned and predetermined by an Internet Service Provider (ISP), cellular telephone service provider, or the like. The data quota may include a data cap, a total amount of available data for the predetermined time period, an amount of data included in a subscription, an amount of data available before extra charges will be incurred, and the like. For example, a user account may be allocated 3 Gigabytes (GB) of data per month under a cellular telephone contract. A user may exceed the data quota and face overage charges. Or, in attempting to stay below the data quota, a user often leaves data unused which is then lost at the end of the predetermined time period.

Therefore, the network device 210 includes a data rate management apparatus 215 that manages a data rate based on an amount of available data for a predetermined time period. The data rate management apparatus 215, in certain embodiments, determines a target data rate and maintains a data rate of the network device 210 at or below the target data rate. The target data rate may be based on an amount of available data for a predetermined time period and an amount of time remaining in the predetermined time period. In one embodiment, the target data rate is set to ensure that the network device 210 will not exceed the data quota for the predetermined time period and will reduce the amount of unused data of the data quota. In certain embodiments, the data rate management apparatus 215 carries over unused data from a sub-time period of the predetermined time period to one or more of increase the target data rate and delay maintaining the data rate at or below the target data rate until the unused data has been consumed. The data rate management apparatus 215 may, as described below, in certain embodiments, manage a data rate for multiple network devices.

The network device 210 may communicate with the network 205 via a network compatible routing card, modem, wireless transceiver, or the like. In one embodiment, the network device 210 is an information handling device which includes memory, a storage device storing computer readable programs, and a processor that executes the computer readable programs as is known to those skilled in the art. The information handling device may comprise an embodiment of the information handling device 100 depicted in FIG. 1. The information handling device may be a portable or handheld device such as a personal desktop assistant ("PDA"), a tablet computer, a slate computer, an e-Book reader, a mobile phone, a smartphone, and the like. In one embodiment, the information handling device may be a desktop computer, a portable computer, a laptop computer, a server, a mainframe computer, and the like. In one embodiment, the network device 210 may be any suitable device that can send and receive data.

The network 205 may be embodied as a global communications network such as the Internet, a Local Area Network ("LAN"), multiple LANs communicating over the internet, a Wireless Local Area Network ("WLAN"), a mobile telecommunications network such as a 3G or 4G network, or any other suitable communications network. The network 205 may be a home network, an office network, a public network, or the like.

In one embodiment, all or a portion of the data rate management apparatus 215 comprises a computer readable program stored and executed by an information handling device. In other embodiments, the data rate management apparatus 215 comprises hardware or a combination of hardware and software. Although the data rate management apparatus 215 is depicted as residing on the network device 210, in other embodiments, all or a portion of the data rate management apparatus 215 may execute on an information handling device separate from the network device 210 (e.g. the device who's data rate is managed) in communication with the network device 210. For example, the data rate management apparatus 215 may reside on an ISP server, a cellular service provider server, or the like. The data rate management apparatus 215 may be a stand-alone network management device or may be incorporated as a hardware or software module of another network management device.

Figure 2B:
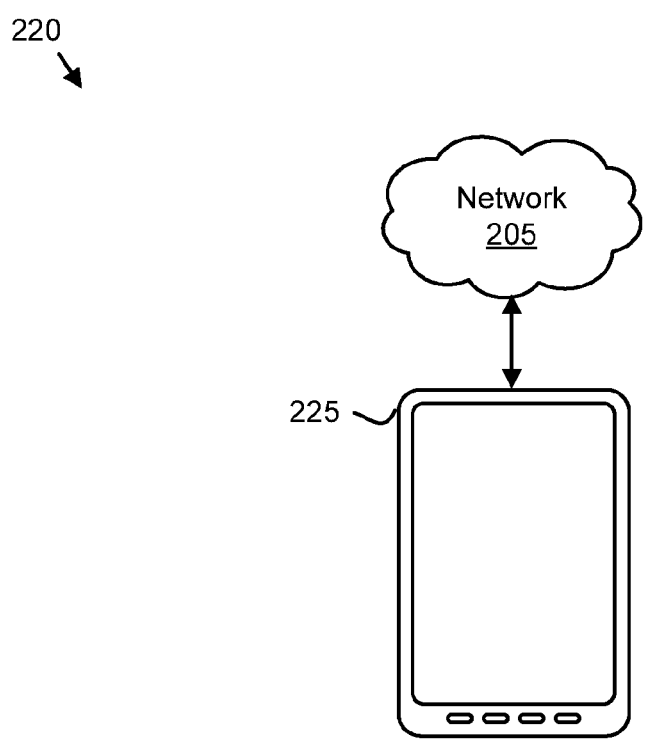
FIG. 2B is a schematic block diagram illustrating one embodiment of a system for managing a data rate on a portable information handling device in accordance with the present subject matter.

Referring also to FIG. 2B, depicting another embodiment of a system 220, the data rate management apparatus may manage a data rate for a portable information handling device 225. The embodiment of FIG. 2B is an example embodiment in which the data rate management apparatus 215 may one or more of reside on and be in communication with a portable information handling device such as a smartphone 225. For example, all or a portion of the data rate management apparatus 215 may execute on the smartphone 225 as a computer readable program. In one embodiment, all or a portion of the data rate management apparatus 215 resides on another device communicating with the smartphone 225 over the network. In one embodiment, the smartphone 225 may communicate over a 3G, a 4G, or other suitable communication network and may have a data quota as described above. The data rate management apparatus 215 may manage a data rate of the smartphone 225 as described above.

Figure 3A:
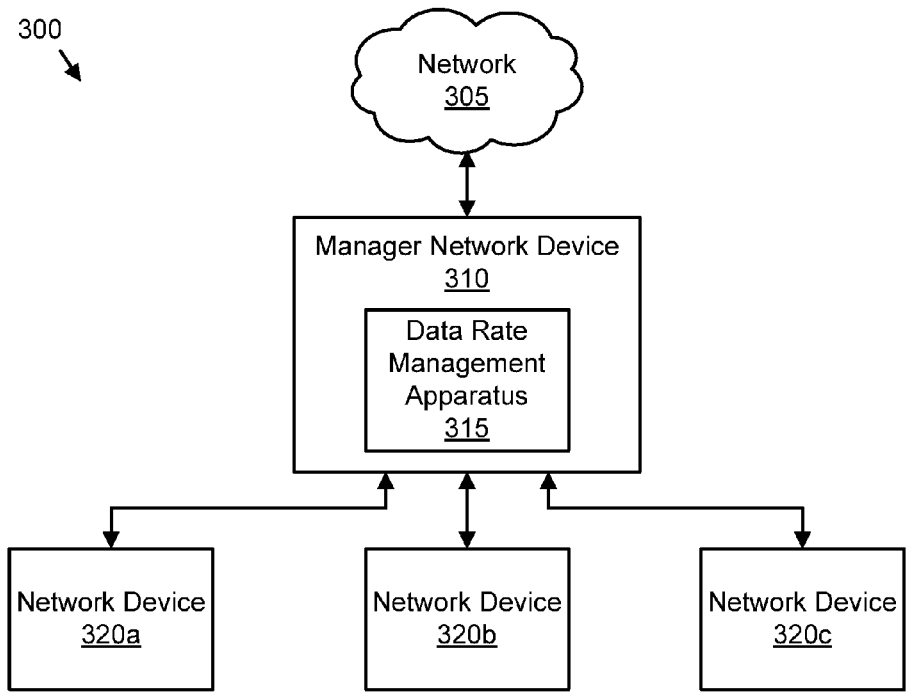
FIG. 3A is a schematic block diagram illustrating another embodiment of a system for managing a data rate based on an amount of available data for a predetermined time period in accordance with the present subject matter.

FIG. 3A depicts another embodiment of a system 300 for managing a data rate based on an amount of available data for a predetermined time period. The system 300 includes a manager network device 310 in communication with a network 305. The manager network device 310 communicates with a plurality of additional network devices 320a-c. The manager network device 310 includes a data rate management apparatus 315. The network 305 may be similar to the network 205 described above in relation to FIG. 2A. Furthermore, the data rate management apparatus 315 may be similar to the data rate management apparatus 215 described above. In addition, in the depicted embodiment, the data rate management apparatus 315 may manage data rates for one or more of the manager network device 310 and the plurality of additional network devices 320a-c. The manager network device may be in communication with the additional network devices 320a-c by way of an additional network, such as a home or office network, distinct from the network 305, a direct cable connection, or the like.

The data rate management apparatus 315 may allocate a portion of the data quota to one or more of the network devices 310, 320a-c and maintain a target data rate on the one or more network devices 310, 320a-c based on time remaining in the predetermined time period. The data rate management apparatus 315 may allocate a portion to a single device, a group of devices, and the like. The network devices 310, 320a-c may be information handling devices as described above. The network devices 310, 320a-c may be devices capable of communicating with the network 305 and may include portable or handheld devices such as a personal desktop assistants ("PDA"s), tablet computers, e-Book readers, mobile phones, smartphones, desktop computers, portable computers, servers, mainframe computers, or other suitable devices.

Figure 3B:
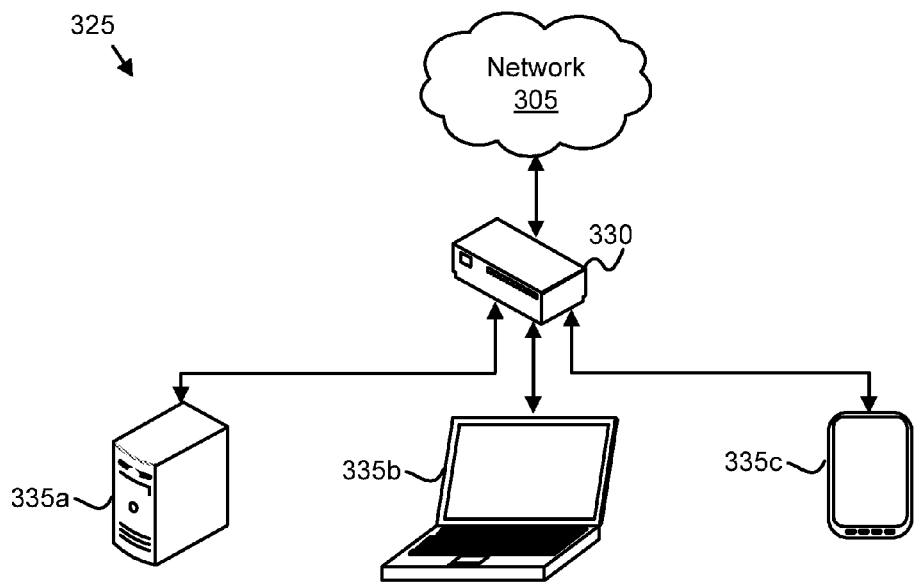
FIG. 3B is a schematic block diagram illustrating one embodiment of a system for managing a data rate on a router for a plurality of network devices in accordance with the present subject matter.

In one embodiment, the manager network device 310 is an access point for other network devices 320a-c on the network 305. The manager network device 310 may manage communication of the one or more additional network devices 320a-c with the network 305. Specifically, referring to FIG. 3B, which depicts an example embodiment of a system 325 in accordance with the present subject matter, the manager network device 310 may be embodied as a router 330 that manages communication for the other devices 335a-c communicating with the network 305. At least a portion of the data rate management apparatus 315 may reside and execute on the router 330. A router 330 with a public "guest" or pass-through networks may treat that network as a single device with a single quota.

Figure 4:
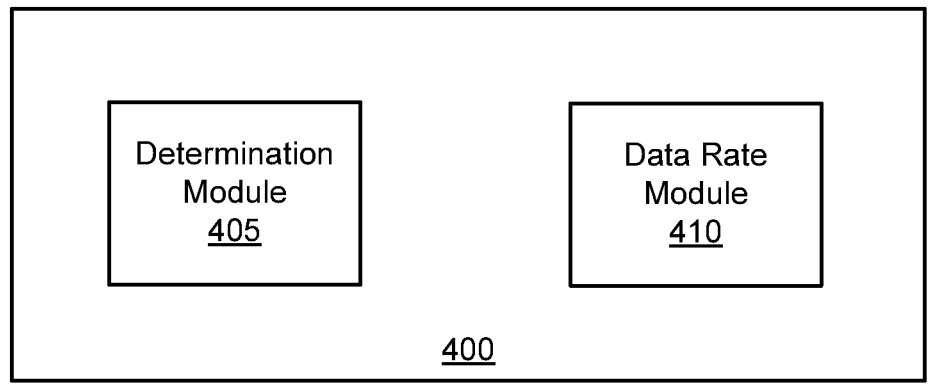
FIG. 4 is a schematic block diagram illustrating one embodiment of an apparatus for managing a data rate based on an amount of available data for a predetermined time period in accordance with the present subject matter.

FIG. 4 illustrates one embodiment of an apparatus 400 for managing a data rate based on an amount of available data for a predetermined time period. The apparatus 400 may comprise one embodiment of the data rate management apparatus 215 depicted in FIG. 2A or FIG. 3A. The apparatus 400 includes a determination module 405 and a data rate module 410.

The determination module 405, in one embodiment, determines a target data rate for data communication over one or more networks by one or more network devices. The network and network devices may be similar to any of those described above in relation to FIGS. 2A-3B. A data rate as used herein, refers to a rate of data communication by a network device over the network and may include one or more of a rate of uploading and a rate of downloading data. A data rate may also be referred to as bandwidth, a bitrate, or the like.

The target data rate may be based on an amount of available data for a predetermined time period and an amount of time remaining in the predetermined time period. The predetermined time period may be a time period based on a contract, a subscription, and the like and may be a week, a month, or other suitable time period. For example, the predetermined time period may be a period of time matching a billing cycle or a time period within the billing cycle. In one embodiment, the predetermined time period is configurable and adjustable by one or more of a user and an application.

The amount of available data may be an amount of data remaining from the data quota for the predetermined time period. In one embodiment, the amount of available data is data remaining from a total amount of available data (e.g. the entire data quota for a particular user account, subscription, group of network devices, and the like). In one embodiment, the amount of available data is data remaining from a portion of the data quota, such as a portion of the data quota allotted to the network device. For example, if a data quota for a subscription is 4 GB per month and 2 GB remain unused, the amount of available data may be 2 GB. If, however, the data quota is apportioned to a plurality of network devices, such as for example, 1 GB per month for each of four devices, the amount of available data may be less than the total remaining of the data quota.

In one embodiment, the target data rate is an average data rate that, if maintained continuously for the amount of time remaining in the predetermined time period, would result in usage of substantially all of a data quota and, in certain embodiments, one or minimize and substantially eliminate unused data of the data quota and usage of data over the data quota.

To determine the target data rate, the determination module 405, in one embodiment, references the amount of available data and the amount of time remaining in the predetermined time period. In one embodiment, the determination module 405 determines the target data rate by dividing the amount of available data for the predetermined time period by the amount of time remaining in the predetermined time period. For example, if 2 days (172,800 seconds) remain in the predetermined time period and the amount of available data for the network device is 10 GB—10,485,760 kilobytes (KB)—the target data rate would be approximately 60.7 kb/s (10,485,760 KB/172,800 seconds). In certain embodiments, the target data rate is configurable by one or more of a user and an application.

In one embodiment, the amount of time remaining in the predetermined time period used by the determination module 405 is the total amount of time remaining in the predetermined time period. For example, if, according to a user's subscription, the data quota is replenished in ten days, the total amount of time remaining in the predetermined time period may equal ten days. In another embodiment, the amount of time remaining in the predetermined time period does not include certain exempt times, such as times in which a user typically does not access the network (e.g. during nighttime hours). In one embodiment, the user may configure exempt times for the determination module 405.

In one embodiment, as described below, the determination module 405 may add amounts of unused data to the amount of available data. The determination module 405 may one or more of increase the target data rate based on the amount of unused data and add the amount of unused data to an amount of available data allocated to a particular network device.

As stated above, the apparatus 400 may manage a data rate for a plurality of network devices. In this embodiment, the determination module 405 may determine a plurality of target data rates for the managed network devices. The target data rate for a particular managed network device may be based on an amount of available data associated with the particular network device (e.g. an amount of data remaining from an allotted amount).

The data rate module 410, in one embodiment, maintains a data rate at or below the target data rate in response to the determination module 405 determining the target data rate. The data rate may be for one or more network devices associated with the target data rate, the amount of available date, the predetermined time, and the like. The data rate module 410 may maintain the data rate by throttling the data rate in response to the data rate one of exceeding the target data rate, reaching the target data rate, and nearing the target data rate within a certain threshold. The data rate module 410 may throttle the data rate by slowing the data rate to an amount below what the network device is capable of receiving, an amount below what the network is capable of delivering, an amount below that specified by the subscription or contract, and the like. Furthermore, the data rate module 410 may throttle the data rate by limiting a rate at which the network device one or more of accepts and transmits data packets over the network.

In one embodiment, the data rate module 410 does not maintain the data rate at or below the target data rate until an amount of unused data is consumed. As described below, the amount of unused data may be data remaining from a previous time period, such as a sub-time period (e.g. a day) in relation to an overall predetermined time period (e.g. a month). For example, if a particular network device is allotted 2 GB per day and the network device does not use a particular day's allotment, the 2 GB may be applied to the following day and the data rate module 410 may not modify the data rate until the 2 GB has been consumed.

In one embodiment, the data rate module 410 stops maintaining the data rate at or below the target data rate in response to determining that a data usage for the amount of time remaining in the predetermined time period will not exceed the amount of available data. For example, if the data rate module 410 determines that 10 GB remain in the predetermined time period and that the network device communicating over the network at an optimal data rate in which the network device is capable will not exceed the 10 GB, the data rate module 410 may stop maintaining the data rate.

In one embodiment, the data rate module 410 stops data communication for one or more network devices in response to the network communication reaching the data quota. This would prevent overage charges. In one embodiment, a user may override the data rate module 410 to restore data communication. In this embodiment, the data rate module 410 may warn the user, such as through a prompt or similar message in a user interface, that the data quota has been reached and may allow the user to override.

Figure 5:
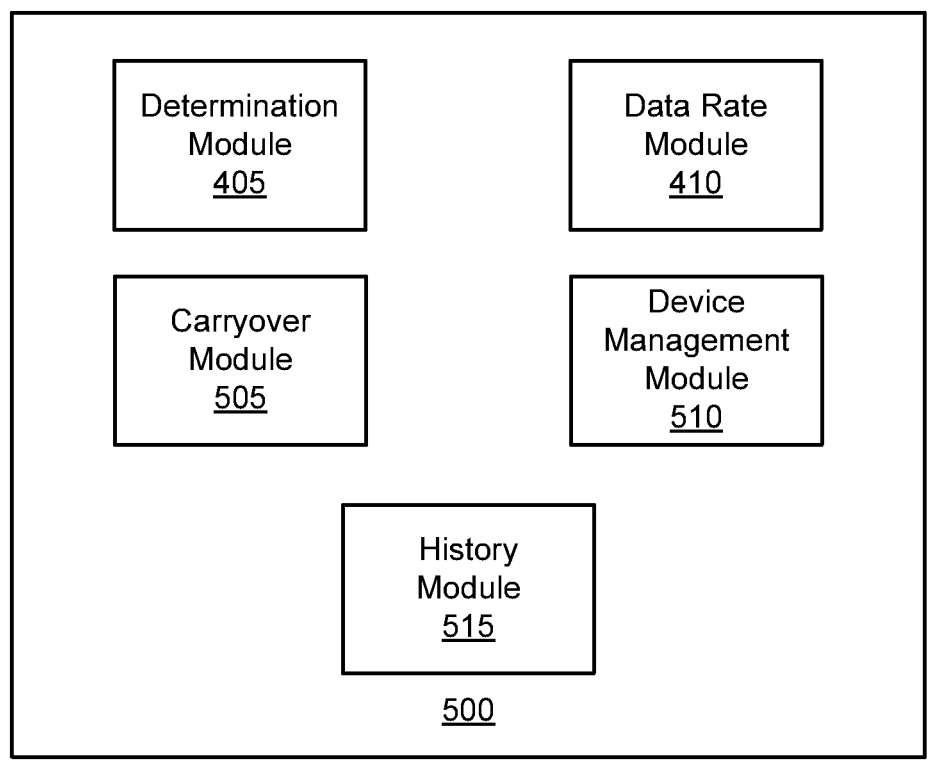
FIG. 5 is a schematic block diagram illustrating another embodiment of an apparatus for managing a data rate based on an amount of available data for a predetermined time period in accordance with the present subject matter.

FIG. 5 illustrates another embodiment of an apparatus 500 for managing a data rate based on an amount of available data for a predetermined time period. The apparatus 500 may comprise one embodiment of the data rate management apparatus 215, 315 depicted in FIG. 2A or FIG. 3A. The apparatus 500 includes the determination module 405 and the data rate module 410, which may be substantially similar to the like named modules of FIG. 4. In addition, the apparatus 500 includes a carryover module, a device management module 505, and a history module 510.

The carryover module 505, in one embodiment, determines an amount of unused data from a particular sub-time period. The amount of unused data may be remaining from the amount of available data for the particular sub-time period. Specifically, in one embodiment, the predetermined time period includes a plurality of sub-time periods and each sub-time period may have an amount of allotted data. For example, the predetermined time period may include a month and the sub-time periods may include days or other suitable sub-time periods. For example, if a particular network device is allotted 2 GB per day and the network device does not use a particular day's allotment, the carryover module 505 may determine that the 2 GB is unused data.

The carryover module 505 may notify the determination module 405 to apply the unused data to increase the target data rate. For example, the determination module 405, in one embodiment, adds the amount of unused data to the amount of available data and increases the target data rate based on the amount of unused data. In one embodiment, the determination module 405 adds the amount of unused data to an amount of available data allocated to an additional network device. For example, unused data from a first device may be applied to the amount of available data for a second device. In one embodiment, the carryover module 505 may notify the data rate module 410 to not maintain the target data rate at or below the target data rate until the amount of unused data is consumed.

The device management module 510, in one embodiment, allocates a total amount of available data to a plurality of additional network devices. In this embodiment, similar to the embodiment depicted in FIGS. 3A and 3B, the device management module 510 may divide the data quota among a plurality of network devices. In this embodiment, the determination module 405 may determine a target data rate for two or more network devices and the data rate module 410 may maintain the data rate of a particular network device at or below the target data rate for the particular network device.

In one embodiment, network devices may be added or subtracted to a group of network devices being managed by the device management module 510. In one embodiment, when a new device is added, the amount of available data for each device is decreased as available data is assigned to the new device. In certain embodiments, particular network devices may be assigned static data amounts that are not affected as network devices are added or removed from the management group.

The history module 515, in one embodiment, maintains a history of data usage. The history module 515 may recognize a reoccurring time period with an increased data rate. For example, the history module 515 may recognize that the data rate used by the network device rises every morning from 9:00 to 11:00. In one embodiment, the data rate module 410 does not maintain the data rate at or below the target data rate during the reoccurring time period. Continuing with the previous example, the data rate module 410 may not maintain the data rate during the reoccurring time period, meaning that the data rate may exceed the target data rate during the reoccurring time period. In one embodiment, the data rate module 410 refrains from maintaining the data rate during a reoccurring time period in response to previous instances in which the data rate has exceeded the target data rate during the reoccurring time period and the data quota was still not exceeded.

Figure 6:
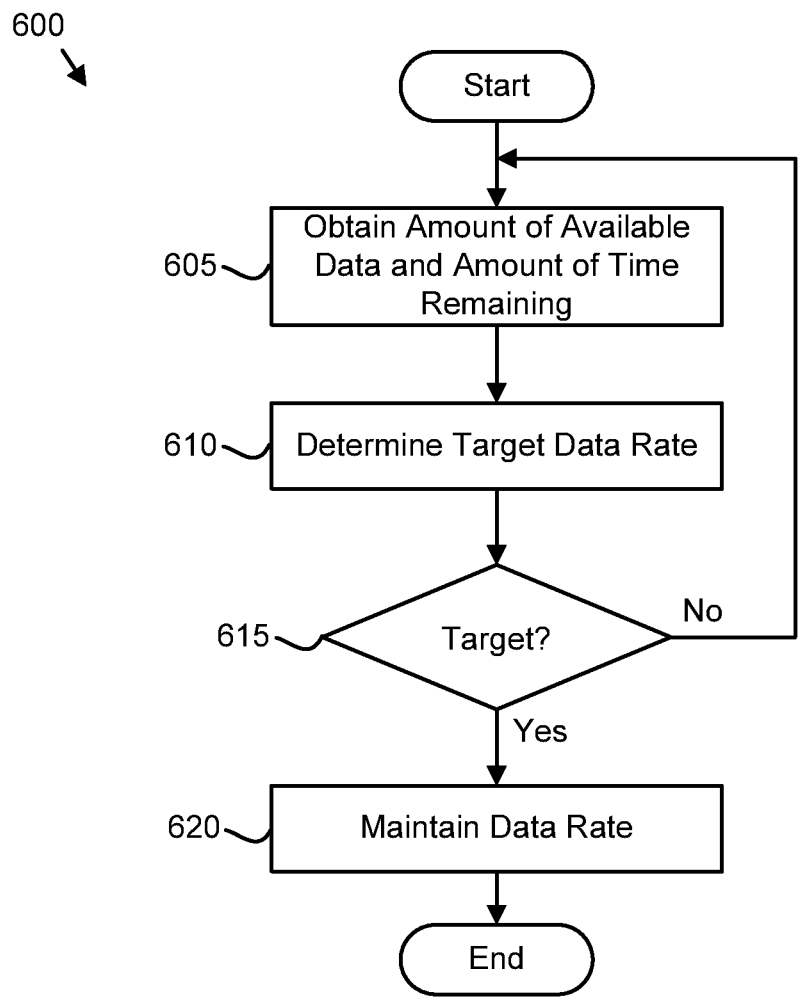
FIG. 6 is a schematic flow chart diagram illustrating one embodiment of a method for managing a data rate based on an amount of available data for a predetermined time period in accordance with the present subject matter.

FIG. 6 illustrates one embodiment of a method 600 for managing a data rate based on an amount of available data for a predetermined time period. The method 600 begins and the determination module 405 obtains 605 an amount of available data for a predetermined time period (e.g. data remaining in the data quota) and an amount of time remaining in the predetermined time period. The determination module 405 may obtain these values from one or more of an ISP, a cellular telephone service provider (e.g. through an application or API), and another entity. In one embodiment, the determination module 405 obtains these values by independently tracking usage and time. The determination module 405 determines 610 a target data rate based on the amount of available data for a predetermined time period and the amount of time remaining in the predetermined time period. In one embodiment, the determination module 405 determines the target data rate by dividing the amount of available data for the predetermined time period by the amount of time remaining in the predetermined time period.

Next, the data rate module 410 determines 615 whether a data rate of the network device one of exceeds the target data rate, reaches the target data rate, and nears the target data rate within a certain threshold. If the date rate module determines 615 that the data rate of the network device one of exceeds the target data rate, reaches the target data rate, and nears the target data rate within a certain threshold, the data rate module 410 maintains 620 the data rate to a value at or below the target data rate. In one embodiment, the data rate module 410 throttles the data rate to the value at or below the target data rate. Then the method 600 ends.

Figure 7:
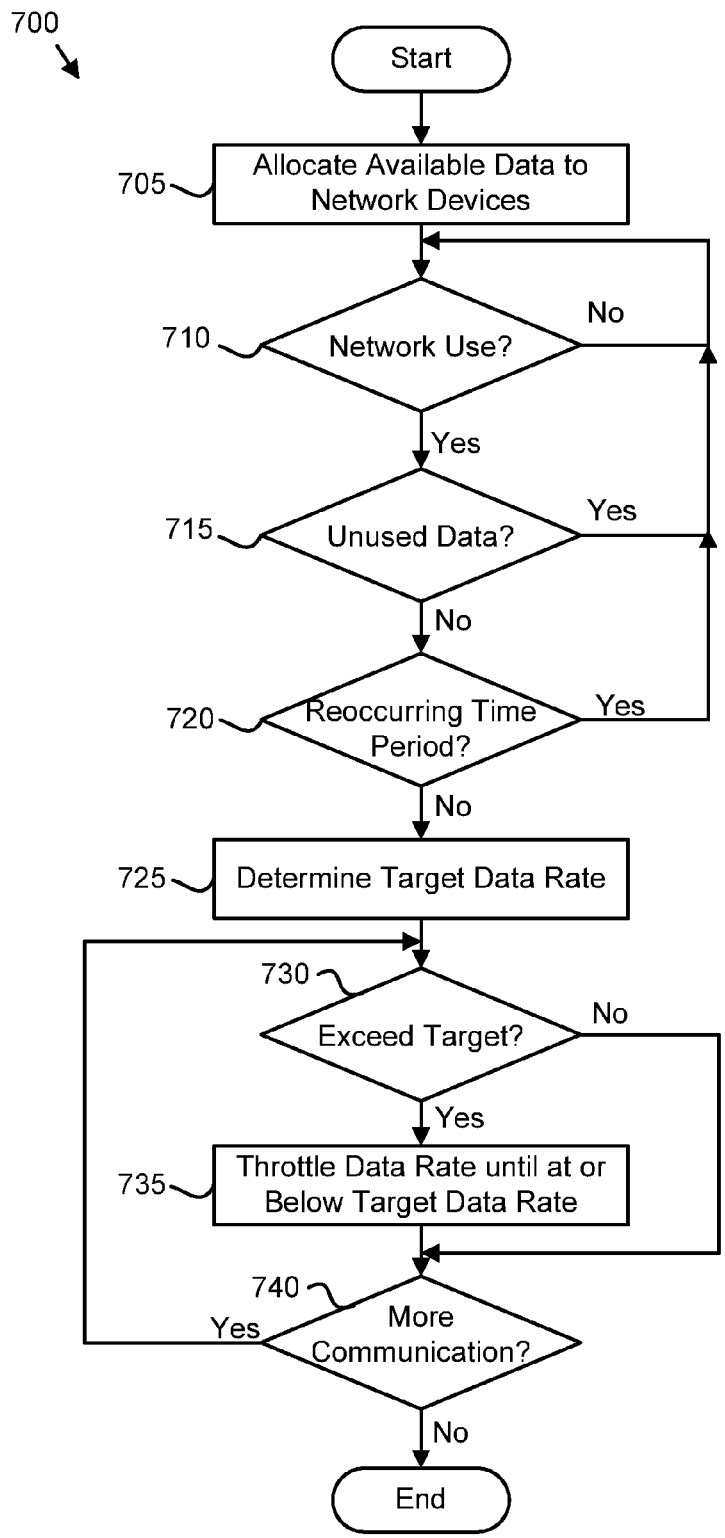
FIG. 7 is a schematic flow chart diagram illustrating another embodiment of a method for managing a data rate based on an amount of available data for a predetermined time period in accordance with the present subject matter.

FIG. 7 illustrates another embodiment of a method 700 for managing a data rate based on an amount of available data for a predetermined time period. The method 700 begins and the device management module allocates 705 a total amount of available data (e.g. a data quota) to a plurality of network devices. If the determination module 405 does not detect 710 network use by network devices, the determination module 405 continues to monitor 710 for network use. If the determination module 405 detects 710 network use by a particular network device, the carryover module 505 determines 715 whether there is unused data available to the network device. If the carryover module 505 determines 715 that there is unused data available to the network device, the determination module 405 continues 710 monitoring for network use.

Alternatively, if the history module recognizes 720 a current time period as a reoccurring time period, the determination module 405 continues monitoring 710 for network use. Otherwise, if the history module does not recognize 720 a current time period as a reoccurring time period, the determination module 405 determines 725 a target data rate for the network device. If the data rate module 410 determines 730 that the data rate does not exceed the target data rate and the determination module 405 determines 740 that there is more communication by the network device, the data rate module 410 continues to monitor 730 the data rate to determine whether the data rate exceeds the target data rate. If the data rate module 410 determines 730 that the data rate exceeds the target data rate, the data rate module 410 throttles 735 the data rate until it is at or below the target data rate. If the determination module 405 determines 740 that there is more communication by the network device, the data rate module 410 continues to monitor 730 the data rate to determine whether the data rate exceeds the target data rate. Otherwise, the method 700 ends.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
a storage device storing machine-readable code;
a processor executing the machine-readable code, the machine-readable code comprising:
a determination module dynamically determining, at a network device, a target data rate for data communication over a network by the network device in communication with a service provider, the target data rate based on an amount of available data for a predetermined time period and an amount of time remaining in the predetermined time period, wherein the target data rate is determined by dividing the amount of available data for the predetermined time period by the amount of time remaining in the predetermined time period, the amount of available data is an amount of data remaining from a data quota for the predetermined time period, the target data rate is determined at least one time after a start of the predetermined time period, the predetermined time period comprises a billing cycle, the predetermined time period comprises a plurality of sub-time periods, and the target data rate is determined by dividing an amount of available data for each sub-time period of the plurality of sub-time periods by a respective amount of time remaining in the sub-time period; and
a data rate module, at the network device, dynamically maintaining a data rate at or below the target data rate in response to the determination module dynamically determining the target data rate, wherein the data rate module maintains the data rate by throttling the data rate in response to the data rate nearing the target data rate.

2. The apparatus of claim 1, wherein each sub-time period has an amount of allotted data, the machine-readable code further comprising a carryover module determining an amount of unused data from a particular sub-time period, the amount of unused data remaining from the amount of available data for the particular sub-time period.

3. The apparatus of claim 2, wherein the data rate module does not maintain the data rate at or below the target data rate until the amount of unused data is consumed.

4. The apparatus of claim 2, wherein the determination module adds the amount of unused data to the amount of available data and increases the target data rate based on the amount of unused data.

5. The apparatus of claim 2, wherein the determination module adds the amount of unused data to an amount of available data allocated to an additional network device.

6. The apparatus of claim 1, wherein the network device is in communication with one or more additional network devices, the network device comprising an access point for other devices on the network, the network device managing communication by the one or more additional network devices with the network.

7. The apparatus of claim 6, wherein the network device is a router.

8. The apparatus of claim 1, wherein the machine-readable code further comprises a device management module allocating a total amount of available data to a plurality of additional network devices, wherein the determination module determines a target data rate for each additional network device and wherein the data rate module maintains a data rate of a particular additional device at or below the target data rate for the particular additional device.

9. The apparatus of claim 1, wherein the data rate module stops maintaining the data rate at or below the target data rate in response to determining that a data usage for the amount of time remaining in the predetermined time period will not exceed the amount of available data.

10. The apparatus of claim 1, wherein the machine-readable code further comprises a history module maintaining a history of data usage and recognizing a reoccurring time period with an increased data rate, wherein the data rate module does not maintain the data rate at or below the target data rate during the reoccurring time period.

11. A method comprising:
dynamically determining, at a network device, a target data rate for data communication over a network by the network device in communication with a service provider, the target data rate based on an amount of available data for a predetermined time period and an amount of time remaining in the predetermined time period, wherein the target data rate is determined by dividing the amount of available data for the predetermined time period by the amount of time remaining in the predetermined time period, the amount of available data is an amount of data remaining from a data quota for the predetermined time period, the target data rate is determined at least one time after a start of the predetermined time period, the predetermined time period comprises a billing cycle, the predetermined time period comprises a plurality of sub-time periods, and the target data rate is determined by dividing an amount of available data for each sub-time period of the plurality of sub-time periods by a respective amount of time remaining in the sub-time period; and
dynamically maintaining, at the network device, a data rate at or below the target data rate in response to dynamically determining the target data rate, wherein maintaining the data rate further comprises throttling the data rate in response to the data rate nearing the target data rate.

12. The method of claim 11, further comprising allocating a total amount of available data to a plurality of additional network devices, the method further comprising determining a target data rate for other devices on the network and maintaining a data rate of a particular additional device at or below the target data rate for the particular additional device.

13. A computer program product comprising a storage device storing machine readable code executed by a processor to perform the operations of:
dynamically determining, at a network device, a target data rate for data communication over a network by the network device in communication with a service provider, the target data rate based on an amount of available data for a predetermined time period and an amount of time remaining in the predetermined time period, wherein the target data rate is determined by dividing the amount of available data for the predetermined time period by the amount of time remaining in the predetermined time period, the amount of available data is an amount of data remaining from a data quota for the predetermined time period, the target data rate is determined at least one time after a start of the predetermined time period, the predetermined time period comprises a billing cycle, the predetermined time period comprises a plurality of sub-time periods, and the target data rate is determined by dividing an amount of available data for each sub-time period of the plurality of sub-time periods by a respective amount of time remaining in the sub-time period; and
dynamically maintaining, at the network device, a data rate at or below the target data rate in response to dynamically determining the target data rate, wherein maintaining the data rate further comprises throttling the data rate in response to the data rate nearing the target data rate.

14. The computer program product of claim 13, wherein each sub-time period has an amount of allotted data, the operations further comprising determining an amount of unused data from a particular sub-time period, the amount of unused data remaining from the amount of available data for the particular sub-time period.

15. The computer program product of claim 14, wherein the operations include adding the amount of unused data to the amount of available data and increasing the target data rate based on the amount of unused data.

* * * * *